2,813,113
METHOD OF MAKING AZELAIC ACID

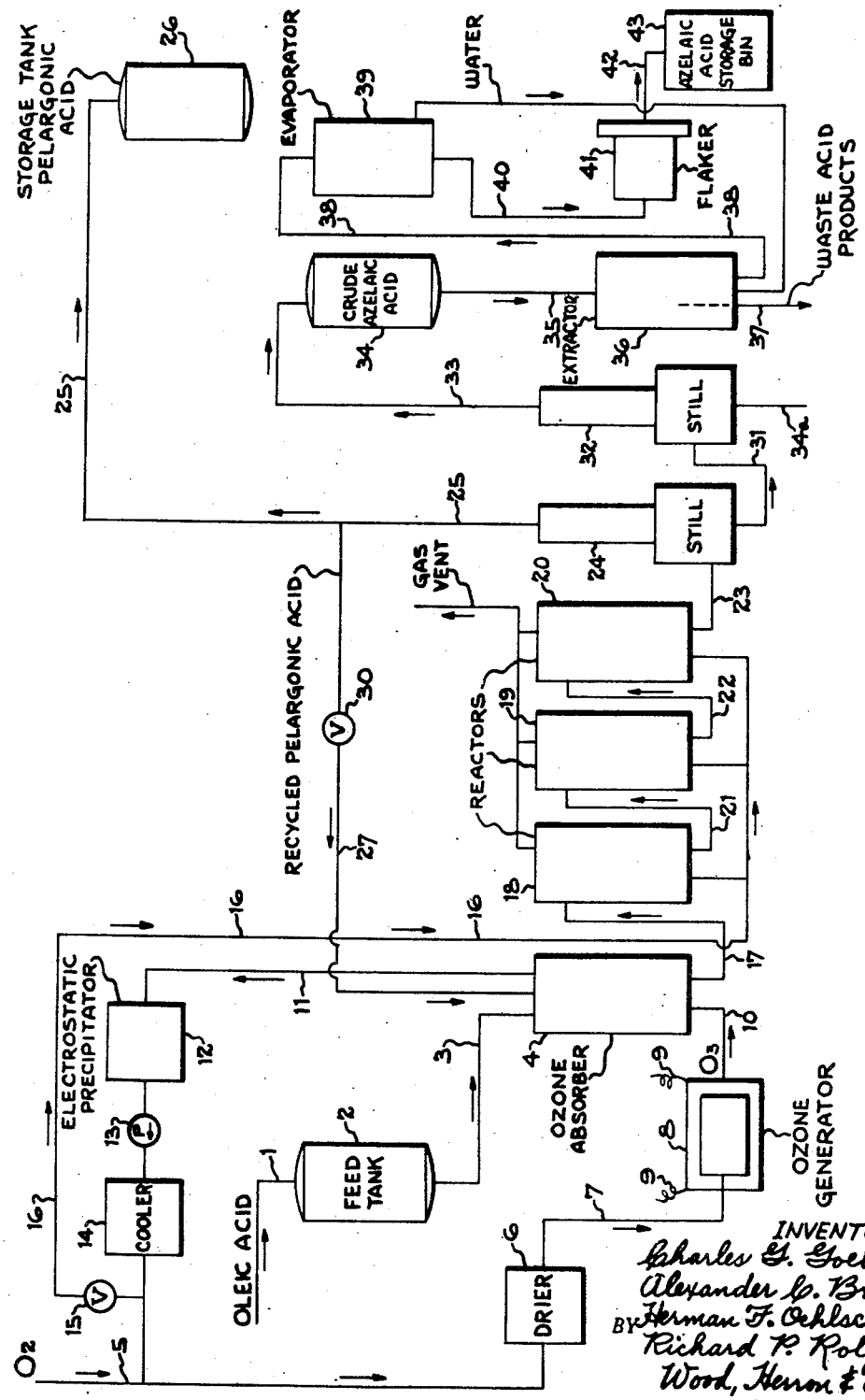

Charles G. Goebel, Alexander C. Brown, Herman F. Oehlschlaeger, and Richard P. Rolfes, Cincinnati, Ohio, assignors to Emery Industries, Inc., Cincinnati, Ohio, a corporation of Ohio Application May 7, 1953, Serial No. 353,628

12 Claims. (Cl. 260—406)

This invention relates to a process primarily intended for manufacturing azelaic acid from commercial oleic acid and, also, to apparatus for carrying out the process. Up to the present time azelaic acid has been manufactured from oleic acid on a commercial scale only by the process disclosed in United States Patent No. 2,450,858, and it is the object of the present invention to provide a commercial process of manufacturing azelaic acid by which the yield of azelaic acid in relation to oleic acid consumed is relatively high and by which the production is effected at least cost. While the present invention is described specifically in relation to the manufacture of azelaic acid, it is to be understood that the method and process may also be used for forming terminal carboxylic acid radicals in place of the double bonds of unsaturated fatty bodies in general, regardless of the exact length of the carbon chain, the position of the double bonds in the chain, or the exact nature of the terminal radicals of the chain. In other words, the process may be used for the treatment not only of oleic acid but of the other unsaturated fatty acids of 10 to 24 carbons chain length which may be obtained from natural fats, oils and waxes, or tall oil, or may be produced synthetically. The invention may also be practiced with the derivatives and compounds of these acids such as their esters, nitriles, amides, soaps, etc., provided the modified product is generally resistant to the action of ozone and oxygen, except at the double bonds.

Regardless of specific identity of the unsaturated fatty body being processed, the present invention provides a method of utilizing gaseous oxygen as a raw material for disruptively oxidizing the fatty body at the double bonds in the carbon chain and synthesizing two carboxylic acid radicals in their place, whereby a single unsaturated molecule is divided into two molecules each of which is a carboxylic acid. In the past this type of disruptive oxidation and synthesis has been effected by strong chemical oxidizing agents such as nitric acid or chromic acid, but no suitable process has been developed wherein gaseous oxygen was utilized as the sole raw material for oxidizing.

Using commercial oleic acid as a typical and exemplary raw material and commercial oxygen of substantially 99½% purity as an example of gaseous oxygen, the invention comprises twice treating a given body of oleic acid with the oxygen, first at a low temperature with the oxygen partially ozonized, then at a higher temperature with the oxygen substantially free from ozone. The first step results in the attachment of one molecule of ozone to the double bond of the oleic acid, and the second step results in the scission and oxidation of the ozonides formed in the first step. The process is based on a series of correlated determinations which were previously matters of uncertainty and speculation.

In the first place, we have determined that despite the literature reports that oleic acid forms a great variety of compounds with oxygen and ozone, the treatment of oleic acid with a mixture of ozone and gaseous oxygen does not produce any substantial amount of products akin to blown oleic acid which cannot be further oxidized and does produce a high percentage of oleic acid ozonides which can be converted to azelaic acid, provided the temperature of the ozone absorbing reaction is properly controlled and the reaction is carried to substantial completion. In other words, there are compounds of oleic acid and oxygen which can be converted to azelaic acid, and there are compounds of oleic acid and oxygen which can not be converted to azelaic acid. If the reaction of ozonized, commercially pure, gaseous oxygen and commercial oleic acid is conducted at a controlled and comparatively low temperature and the reaction is continued until the greatest possible weight of ozone has been added to the oleic acid, then the resulting addition product or products, generally termed an ozonide or ozonides, provides a very high yield of azelaic acid when properly split and oxidized in a second step.

The second critical determination on which this invention is predicated is that oleic acid ozonides of the type described may be best split and oxidized by gaseous oxygen, the two reactions being preferably performed simultaneously at a temperature substantially above that at which the ozone absorbing operation is performed. In other words, we have determined that although gaseous oxygen is almost completely inert to oleic acid and its ozonides at low temperatures, the gaseous oxygen at higher temperatures is an excellent oxidizing agent for the decomposed ozonides provided the gaseous oxygen is then substantially free from ozone which if present would destructively oxidize the acids. Still otherwise expressed, while gaseous oxygen is inert to oleic acid and its ozonides at low temperatures and destructively oxidizes them at high temperatures, particularly if any appreciable content of ozone is present, there is an intermediate temperature range in which the treatment with gaseous oxygen converts the oleic acid ozonides to azelaic acid and pelargonic acid in a manner to provide a particularly high yield of the former.

A third determination on which this invention is predicated is that the amount of gaseous oxygen which is required for each second step does not substantially exceed the amount of fresh oxygen required for each first step. In other words, since chemically pure oxygen is not obtainable at any reasonable cost and commercial oxygen contains from a fraction of a percent up to several percent inert gases and nitrogen, the body of oxygen which is utilized for the first step of the process is bound to depreciate in relative oxygen content because the oleic acid being treated removes oxygen without removing the nitrogen or inert gases. Therefore, to maintain oxygen concentration at any desired level it is necessary continuously or periodically to bleed oxygen gas from the ozone generating system and add fresh oxygen thereto. Otherwise the build up of impurities in the system would eventually impair its operation and require complete discarding of the gas. We have determined that the second oxidizing step of the process, if performed at the right temperature, can be consummated with a volume of oxygen which is not substantially greater than that which must necessarily be bled from the ozone generator system to maintain a high oxygen concentration. This holds true even if 99.5% pure gaseous oxygen is employed and for many practical reasons the use of oxygen of this order of purity is recommended.

While a reasonable yield of azelaic acid may be obtained from a given quantity of oleic acid by treating the oleic acid at a controlled low temperature with ozonized air and then blowing the ozonide at a higher temperature, also with air, as a practical matter this procedure is not recommended. In the first place, the process involves two steps in each of which a liquid and a gas must be brought into sufficiently intimate contact to react chemically, and the presence of 80% inert nitrogen greatly complicates the problem of contacting the gas and liquid in a manner to secure prompt and sufficient reaction between them. In the second place, from the point of view of consumption of electric current, ozone is much more efficiently produced when oxygen is ozonized than when air is ozonized, so that from this point of view the cost of the ozone may be said to be a function of the oxygen concentration. In the third place, the ozone generator and the equipment used for the secondary oxidation would both have to be very much larger if ordinary air were employed instead of oxygen, not only because the equipment would have to contain a greater volume of gas, but also because reactions would be slower and it would take a far greater length of time to process any given quantity of oleic acid. In the fourth place, the presence of nitrogen in the oxygen in any amount over substantially one-half of one percent tends to produce discoloration of the finished product. And in the fifth place, the gas tends to entrain some organic vapor, the amount of entrainment depending on the volume of the gas. The use of air would greatly increase volatilization losses. Thus, while the process may be practiced with air or gases having a wide range of oxygen concentrations, the use of commercially pure oxygen is preferable and stands for the difference between a low cost process and a less economical process. By commercially pure oxygen we mean gaseous oxygen which contains impurities which may be as low as a fraction of 1% and may run up to, say 5%. The present process does not require oxygen of any particular degree of purity and may be said to be feasible with any gaseous oxygen, that is, a gas having an oxygen content of greater than 75% but to be particularly efficient with gaseous oxygen having a purity of above 99%. The invention will be explained using 99½% pure gaseous oxygen as an example because such oxygen is presently available at prices which do not greatly exceed the prices of oxygen of lesser purity.

From the point of view of apparatus the invention comprises a closed oxygen circulating system wherein the oxygen is cycled and re-cycled through an ozone generator, an absorber in which the oxygen and ozone are contacted with the oleic acid and then back to the ozone generator. We have determined that the oxygen from the absorber may be re-ozonized if it is properly reconditioned. We have further determined that the oxygen becomes contaminated in the absorber so that upon leaving the absorber it carries three foreign substances, each of which impairs the efficiency of the ozone generator, the three substances being water vapor, organic vapor, and organic particles which form a fog or mist. The oxygen is reconditioned by being passed through an electrostatic precipitator, then through a dehydrator. The organic fog forming particles which contaminate the oxygen and tend to film on the tubes of the ozone generator, whatever they may be, are removed by the electrostatic precipitator. The vapors, organic and aqueous, are removed by the dehydrator. The dryness of the oxygen is important from the point of view of the efficiency of the ozone generator, and only pure dry oxygen can be economically ozonized.

The absorber is preferably, although not necessarily, of the countercurrent type and is so constructed that each and every part of it is cooled to hold the temperature of reaction below the temperature of scission of the fatty ozonides. A temperature rangs of 25 to 45° C. is satisfactory and may be conveniently maintained. The countercurrent contacting of the ozone and fatty body tends to distribute the heat which results from the chemical reaction over the entire length of the absorber, in other words tends to equalize it, which reduces danger of local overheating.

The oxygen containing ozone and the fatty body are fed at rates in relation to each other so that all but minute traces of the ozone are removed from the oxygen which passes through the absorber and the fatty body absorbs as much ozone as it is capable of absorbing. By using this countercurrent system it is possible to add substantially 15–17% to the weight of the oleic acid passing through the absorber.

Fresh oxygen is intermittently or continuously fed into the system, preferably between the electrostatic precipitator and the ozone generator, and a volume of oxygen gas is continuously or intermittently exhausted from the system intermediate the drier or dehydrator and the ozone generator.

The apparatus used for performing the second step of scission and oxidation of the ozonides may be of any one of a wide variety of designs. The problem is to obtain maximum contact between a liquid and a gas while removing heat and many devices may be utilized for this purposes. In general it is recommended that the oxygen gas be blown through the ozonides and its thermal decomposition products which are agitated at the same time to further the dispersion of the oxygen gas.

If desired, the ozonides may be heated and decomposed to a mixture of azelaic acid, pelargonic acid, azelaic half aldehyde, and pelargonic aldehyde, as well as waste acids and degradation products, after which this mixture may be oxidized to convert the aldehydes to the corresponding acids. We have determined, however, that is it preferable to split the ozonides and oxidize the aldehydes simultaneously; this practice seems to produce approximately 10% more azelaic acid than the performance of the two steps serially. One possible explanation for this improved result is that aldehydes in general tend to polymerize very readily and the simultaneous splitting and oxidation tends to convert the aldehydes to acids before they can polymerize and form high boiling substances which end up as tar or pitch.

In fact, the preferred method of operating the process of this invention is to feed a stream of oleic acid ozonides continuously into a vessel or a receptacle which contains partially split and oxidized ozonides. In other words, the preferred process is a continuous process in which a stream of fresh ozonides is continuously fed into a body of partially processed ozonides so that the fresh ozonides are continuously diluted.

To start the reaction of simultaneous scission and oxidation it is necessary to elevate the temperature of the ozonides to a point above the temperature of scission of the ozonides which in general is about 60° C. After the reaction has once been initiated then the oxidation provides sufficient heat to elevate the temperature of the infeed of ozonides above the scission temperature, and if enough oxygen is utilized, the reaction is sufficiently exothermic to require positive cooling. It is recommended that the amount of ozonides and the amount of oxygen used in this second step be sufficient to provide a reaction rate which requires cooling to maintain the desired temperature. This rate of reaction insures prompt oxidation of scission products. The oxygen thus performs a double function, oxidizing aldehydes to acids which reaction generates enough heat to elevate the temperature of the fresh ozonides above the temperature of scission. When oleic acid is being processed to obtain azelaic acid the oxidation should be continued until the acid number reaches substantially 390 and may advantageously be continued until the acid number reaches substantially 425.

In general the splitting and oxidizing of the ozonides requires from 4 to 8 hours depending upon the efficiency of the equipment in effecting intimate contact between the oxygen and the ozonides. While most ozonides are supposed to decompose promptly when their temperature is elevated above the temperature of scission and while aldehydes are supposed to be oxidized relatively easily, still the reaction seems to proceed relatively slowly and the desired high yields of azelaic acid are obtained only by continuing the process over a substantial period of time until as much oxygen as possible has been added to the mixed oxidation products. While the gaseous oxygen seems to react readily with the aldehydes and generate substantial heat during the initial period of contact, still the reaction goes to completion slowly and there is considerable indication that the ozonides do not split automatically and immediately upon being brought to the temperature of scission.

Regardless of theory, we have determined that the highest yields of azelaic acid are obtained if the oleic acid ozonides are treated with oxygen gas at a temperature above the temperature of scission of the ozonides and when the rate of the reaction is such that the temperature must be limited by positive cooling to maintain it within a given range.

We have also determined that an oxidation strong enough to effect the oxidation of the aldehydes to acids can also produce some amount of destructive oxidation, that is, oxidation which produces gases on the one hand or degradation products which appear as still residues on the other hand. If the temperature of the simultaneous scission and oxidation is too low then the gaseous oxygen does not oxidize the aldehydes to carboxylic acids sufficiently rapidly to avoid polymerization; on the other hand, if the temperature is too high, then there is too much destructive oxidation. In general, a range of 75 to 120° C. is suitable for the practice of the process. We have found that the best yields of azelaic acid are obtained if a temperature slightly below 100° C. is maintained during the operation.

Another point of some importance which was developed in the research upon which the present invention is predicated is that the presence of any substantial quantity of water in the treatment of the ozonides is undesirable. In the literature it has been proposed that the oleic acid ozonides be hydrolyzed and oxidized either in two steps or one. For instance, it has been proposed that the ozonides be heated in an aqueous solution of silver oxide. We have determined that the presence of any quantity of water which would be suitable for an intended hydrolysis is undesirable and that higher yields of azelaic acid are obtained if the ozonides and their decomposition products are treated with gaseous oxygen under substantially anhydrous conditions. By the latter term we mean that the amount of water or moisture present should not exceed say 5 or 10%, that is, there should be no water present as a second phase. Naturally, blowing a chemical mixture of the type in question with a substantial amount of oxygen at a temperature which approximates the boiling point of water tends to dehydrate the mixture in any event. The point is that while no precautions need be taken to preclude the presence of water in the blowing operation and while a small quantity of water may be present without either hurting or helping the operation, no water is needed to effect "hydrolysis" as suggested by the literature, and further, the use of water presumably to "hydrolyze" the ozonides actually reduces the yield of azelaic acid.

The efficiency of the step of oxidizing the ozonide scission products with oxygen is surprisingly high considering first that oxidation reactions in general are difficult to control and tend to produce by-products, and second that the reaction involves contact between a gas and a liquid. According to theory the conversion of oleic acid to azelaic acid and pelargonic acid requires the addition of four atoms of oxygen to the double bond. Three of these oxygen atoms are added in the first step in which the ozone adds to the double bond. Upon scission the ozonide breaks down into an acid and an aldehyde so that one more atom of oxygen must be added to convert the aldehydes to acids. Therefore, in theory, one third as much oxygen must be added in the second oxidation step as was added in the first ozonization step.

The amount of oxygen which must be utilized in the second oxygen treating step is in part a function of the efficiency of the equipment employed to interact the gas and liquid but is also in part a function of the control of the rate and conditions of oxidation. The ozonides decompose and oxidize to form not only azelaic and pelargonic acids but also waste acids, polymers, tars and decomposition products. Some of the decomposition products are gaeous and must be flushed from the operation to prevent build up and consequent dilution of the oxygen, which would reduce the efficiency of the operation. This involves the discard of some oxygen, but nevertheless, the tendency of the oxygen to react with the ozonides and their decomposition products is such that the total amount of oxygen required for the entire operation amounts to only about 20% over the total theoretical requirement.

The amount of oxygen discarded in the oxidation step is only slightly in excess of the amount which necessarily should be withdrawn from the commercial oxygen recycling in the ozonization step in order to prevent a build-up of non-oxygen impurities. The use, in the oxidation step, of oxygen which would otherwise have been withdrawn and discarded in the ozonization step results in an overall efficiency of oxygen usage of from 75% to 80%.

The process of the present invention will be best understood in relation to the description of the accompanying drawing which is a diagrammatic flow chart indicating the pieces of equipment used and their relationship in the process. Referring to the drawing, oleic acid is fed through conduit 1 to feed tank 2 and thence from feed tank 2 through conduit 3 to the ozone absorber 4, in which the oleic acid is flowed countercurrently in relation to a continuous flow of oxygen gas which contains ozone. It is to be understood that the abosrber is cooled or refrigerated by means, not shown, to substantially equalize the temperature of the reaction occurring therein, and that this cooling is facilitated by the circumstances that the flow is countercurrent and the reaction consequently extends over a substantial zone.

The absorber is fed with ozonized oxygen gas by a continuous closed system through which the oxygen circulates. Thus, a given body of oxygen is used and reused many times and the system need be bled and fed only to a small extent to maintain the oxygen purity at a predetermined high level. The circulating oxygen system comprises the oxygen infeed conduit 5 which leads to a dryer 6. From the dryer the oxygen is transferred through conduit 7 to an ozone generator 8 in which ozone is generated in the oxygen by electrical means, the input and output electrical leads being indicated at 9. From the ozone generator the ozonized oxygen passes through conduit 10 to absorber 4 in which its ozone content is absorbed by the oleic acid as explained. From the absorber 4 the oxygen gas, now substantially devoid of ozone, passes through conduit 11 to electrostatic precipitator 12 in which organic matter, present in the form of a mist or fog, which may have been picked up in the absorber is electrostatically precipitated. The purified oxygen gas then passes from the electrostatic precipitator 12 through a compression pump 13 to a cooler and dehydrator 14 in which all moisture is removed from the oxygen gas. Next, the oxygen gas passes through a conduit to the oxygen input conduit 5. Between the cooler and dehydrator oxygen gas is bled from the system through valve 15 and conduit 16 which leads to the ozonide decomposing system.

The oleic acid ozonides are transferred to the ozonide decomposing system through conduit 17 and there are treated with oxygen gas bled from the ozone generating system through conduit 16. This oxidizing and decomposing system may be constituted by any type device which is adapted to provide substantial interfacial contact between a liquid and a gas and which may be cooled or refrigerated to limit the temperature of the reaction. As disclosed, this system comprises three reactors 18, 19 and 20 which are connected in series by conduits 21 and 22. The oxygen bled from the ozone generating system through conduit 16 is fed into the bottom of each reactor and is agitated with the liquid in each tank by means of mechanical agitators which are not shown.

While three reactors are disclosed in the drawing it is to be understood that any number may be used depending upon the size of the reactors, the rate of the flow of the ozonides and their decomposition products, and the efficiency of the agitation in effecting contact between the oxygen gas and the liquid being treated. In putting the plant into operation the ozonides in the first reactor must be heated sufficiently to reach a temperature at which the ozonides decompose. After reaching this temperature the oxidation of the aldehydes takes place at a rate sufficient to generate the heat required to elevate the temperature of the incoming stream of ozonides properly. In fact, the first reactor should be water cooled in order to prevent the temperature from rising above the predetermined level. In the drawing the heating and cooling means are not shown. As the ozonides and their decomposition products pass from reactor to reactor the rate of oxidation tends to fall with the result that it may be necessary or desirable to supply heat to the last reactor in order to maintain a temperature suitable for efficient oxidation. The desirability of heating or cooling devices on the reactors subsequent to the first reactor depends entirely upon the number of reactors used, the rate of flow and the efficiency of the agitation.

From the last reactor of the decomposing and oxidizing system the mixed oxidation products pass through conduit 23 to still 24 where the pelargonic acid is distilled from the mixed oxidation products. The pelargonic acid is condensed and removed from still 24 through conduit 25 to the storage tank for pelargonic acid 26. However, some of the pelargonic acid which is distilled from the mixed oxidation products may be recycled in the system to dilute the oleic acid and the oleic acid ozonides if desired. Thus, pelargonic acid is conveyed through conduit 27 to the absorber to reduce the viscosity of the ozonides in the absorber. The conduit 27 is provided with a valve 30 to control the amount of pelargonic acid recycled.

While other viscosity reducers and diluents may be used, such as acetic acid, ethyl acetate, etc., the use of the pelargonic acid is recommended because it is an end product of the process, an ideal diluent, does not interfere with the operation of the circulating oxygen system and requires no separate distillation. In other words, since pelargonic acid is one of the end products of the process, by recycling part of that produced, it becomes unnecessary to introduce an additional chemical compound into the system to serve as a diluent and viscosity reducer.

The mixed oxidation products now stripped of pelargonic acid are next conveyed through conduit 31 to a second still 32 in which the other volatile acids are distilled from the non-volatile waste products. The volatile products are condensed and conducted by conduit 33 to a mixed acid storage tank 34. The non-volatile pitch which remains is removed through conduit 34a.

The mixed acids include azelaic acid and a wide variety of monobasic acids of undetermined identity. These monobasic acids or waste or by-product acids usually comprise 15 to 20% of the mixed oxidation products. Some of the waste acids are saturated fatty acids which occurred as impurities in the commercial oleic acid used as a starting material. Others are oxygenated products which are different from azelaic acid but boil within the same temperature range. The next step in the process is to separate azelaic acid and the waste acids.

From the acid storage tank 34 the acids are fed through conduit 35 to extractor 36 where the azelaic acid is extracted with hot water. The waste acids do not dissolve in hot water and are removed from the extractor through conduit 37. The hot water containing the azelaic acid is fed through conduit 38 to evaporator 39 in which the water is removed from the azelaic acid. If desired, a crystallizer may be used in place of the evaporator. Next, the azelaic acid in molten condition is fed from evaporator 39 through conduit 40 to flaker 41, thence through chute 42 to the azelaic acid storage bin 43.

To exemplify the practice of this invention with the equipment disclosed in the drawing, the treatment of 1000 pounds of commercial oleic acid having a titre of 5.5° C. and iodine value of 90 is disclosed. The oleic acid is fed continuously to the absorber where it is diluted with 500 pounds of pelargonic acid from a previous run. In the absorber the mixture of oleic and pelargonic acids is contacted in countercurrent flow with oxygen gas of substantially 99.5% purity which is ozonized to an ozone content of substantially 1.75%. For 1000 pounds of oleic acid substantially 9700 pounds of ozonized oxygen are employed. The rate of flow of the oleic acid and the ozonized oxygen is so controlled that the oxygen gas leaving the absorber does not contain more than a trace of ozone as determined by the liberation of iodine from potassium iodide and the ozonized oleic acid leaving the absorber has an active oxygen content of substantially 90% of the theoretical amount which should have been absorbed, as calculated from the iodine value of the oleic acid being processed. This treatment increases the weight of the oleic acid by substantially 17%.

The ozonized oleic acid is then fed continuously to the reactors 18, 19 and 20 for decomposition and further oxidation. The capacity of the reactors are such that the ozonized oleic acid is treated with oxygen gas for a period of approximately six hours. Since this treatment is accomplished by adding the ozonized oleic acid to the partly decomposed products already contained in the reactors, there is at no time a relatively high concentration of pure ozonides in the oxidizing equipment. The rate of flow of the oxygen gas through the mixture of ozonized oleic acid and its decomposition and oxidation products is such that the aldehydes which are formed by the scission of the ozonides are oxidized as promptly as possible.

Both the scission of ozonides and the oxidation of aldehydes are exothermic reactions producing sufficient heat to maintain a temperature of 95° C. which is utilized for the scission and oxidation reaction. In fact, oxygen is blown into the reacting mix at such a rate that cooling water is required to prevent the temperature of the mix in the first reactors from exceeding 95° C. During this treatment the reacting mass is agitated to produce the greatest possible contact between the oxygen and the ozonized oleic acid and its decomposition and oxidation products. For each pound of ozonized oleic acid treated 1.2 cubic feet of oxygen gas of substantially 98% purity is employed, i. e. 0.1 pound of oxygen for each pound of ozonized oleic acid treated.

The time of heating is sufficiently long and the oxygen treatment is sufficiently vigorous that analysis of the active oxygen content of the material leaving the last reactor has decreased to 4% of its original value and the acid number has increased from an initial figure of 250 to 421. This reaction represents substantially complete decomposition of the ozonide and substantially complete oxidation of the available aldehydes to acids.

From the reactors the mixed oxidation products are fed to still 24 in which the pelargonic acid is removed. This operation is performed by maintaining a still temperature of 230° C. and a vacuum of 25 mm. of mercury. With the materials used in this example the total pelargonic acid recovery amounts to 900 pounds, that is, the 500 pounds used for the dilution of the oleic acid and 400 pounds of new pelargonic acid freshly produced from the oleic acid being processed. This amounts to 40% pelargonic acid recovery, based on the weight of the 1000 pounds of oleic acid which were treated.

Next, the mixed oxidation products other than the pelargonic acid are fed to still 32 in which the azelaic acid and other acids which boil in the same temperature range are removed at a still temperature of 270° C. with a pressure of 3–4 mm. of mercury. The still residue amounting to 70 pounds is withdrawn and discarded as a waste tar or pitch. The distillate is then treated with water at a temperature of 95° C. to dissolve azelaic acid and separate it from the other acids produced in the process which are water insoluble. The amount of water used is 8000 pounds. The water is then drawn off and evaporated leaving a residue of 520 pounds of azelaic acid or 52 percent of azelaic acid, based on the weight of the oleic acid treated. The water insoluble acids which remain after withdrawal of the water containing the azelaic acid weigh 180 pounds and amount to 18%, based on the weight of the oleic acid treated. Thus, the end products of the process weigh 1170 pounds, which amounts to 17% weight increase, based on the amount of the oleic acid treated.

From the foregoing example it is to be observed that the major weight increase which is effected by oxidation takes place in the first step of the process which comprises the forming of the ozonides of oleic acid. Theoretically, the second oxidizing step, that is, the oxidation of the aldehydes, should add one-third again as much weight to the mixed oxidation products as the weight increase accomplished in the first step. However, some side reactions take place when the ozonides are split in the presence of gaseous oxygen, and therefore, some destructive oxidation takes place which results in the evolution of volatile end products which are removed from the reactors with the excess oxygen gas. This loss offsets the weight increase which attends the oxidation of the aldehydes to acids.

During the treatment just described a total of 280 pounds of oxygen gas have been removed from the circulating system of which the ozone generator and ozone absorber form a part, 170 pounds by ozone absorption and 110 pounds for the second oxidation. Therefore, in order to maintain the amount of oxygen employed in the ozone generating system relatively constant, 280 pounds of oxygen of 99.5% purity are added to the system at a rate appropriate to maintain uniformity of pressures. This addition is then sufficient to maintain oxygen purity at the desired high level.

A great variety of raw materials other than commercially pure oleic acid may be treated by this process. For instance, azelaic and pelargonic acids may be obtained from oleic acid which is combined with other fatty acids such as stearic and palmitic acids. The starting material may be mixtures of fatty acids which are obtained from animal fats and greases, mixtures of fatty acids obtained from vegetable sources such as the fatty acids of cotton seed oil, soy, corn seed oil, etc., or mixtures of fatty acids obtained from fish and marine oil. Practically all of the fats and oils which occur in nature contain oleic acid in combination with other fatty acids, and it is not necessary to separate the oleic acid from the other fatty acids in order to use the oleic acid in this process.

If mixtures of fatty acids which contain any substantial amount of polyunsaturated compounds are used as a starting material, the efficiency of the process will be less than if pure oleic acid is used, at least from the point of view of the production of azelaic and pelargonic acids. Even with commercial oleic acid the fractions called "azelaic acid" and "pelargonic acid" are not absolutely pure fractions because the double bonds of such oleic acid molecules do not always occur between the ninth and tenth carbon atoms of the chain. The process inherently produces a range of dibasic acids and a range of monobasic acids, but quantitatively the azelaic and pelargonic acids predominate. Erucic acid, which may be obtained from rape seed oil, may be used as a starting material in which case the end product is a dibasic acid predominantly of thirteen carbon chain length.

When mixtures of fatty acids containing large amounts of polyunsaturated acids are used as starting materials, the consumption of ozone and oxygen is greater and losses through the formation of volatile scission products is greater. The variety of end products obtained is likewise greater, their exact nature depending upon the positions of the double bonds in the carbon chains. It is also to be noted that mixtures of fatty acids which contain substantial quantities of polyunsaturated acids react more rapidly with ozone than oleic acid, thus making temperature control more difficult. While the preferred operating range is 25 to 40° C. the absorption of ozone by the unsaturated fatty acids may take place at much lower temperatures and with special equipment for providing good temperature control the ozone absorbing reaction may be allowed to proceed at a temperature as high as 45° C. without ill effects.

Whatever may be the exact nature of the starting material, the critical steps of this process are essentially the same. Commercially pure oxygen is passed cyclically through an ozone generator and through an absorber in which the ozone is absorbed by the fatty body. Oxygen is withdrawn from the cyclic system and used to oxidize decomposed ozonides in a second step, which withdrawal of oxygen also serves to prevent build up of impurities in the circulating system. The oxygen thus removed and the oxygen removed as ozone from the circulating system are replaced with fresh oxygen to maintain the desired quantity and standard of purity of the oxygen in the circulating system. By this use of gaseous oxygen for both steps of the process oxygen is conserved and a high yield of azelaic and pelargonic acids in relation to by-product acids, pitch and volatile end products is obtained.

Having described our invention, we claim:

1. The method of forming two terminal carboxylic acid groups in place of the double bonds of unsaturated fatty bodies of the class consisting of unsaturated fatty acids of 10–24 carbon atoms chain length and esters, nitriles, amides and soaps formed by modification of the carboxylic acid group of said acids, said method comprising circulating a body of gaseous oxygen cyclically through an ozone generating zone and through an ozone absorbing zone, passing the fatty compound through the absorbing zone and exposing it to the ozonized oxygen gas whereby the ozone reacts with the fatty compound to form ozonides thereof, controlling the temperature of the reaction so that it does not exceed substantially 45° C., withdrawing oxygen gas which contains substantially no ozone from the circulating body of oxygen gas and adding to the circulating body a volume of oxygen gas equal to that of the gas withdrawn and that removed as ozone, the oxygen gas added being of greater purity than the oxygen gas withdrawn, whereby the oxygen concentration of the body of circulating gaseous oxygen is held constant, then simultaneously splitting said ozonides and oxidizing the products of the scission thereof by treating the ozonides and the scission products thereof with the oxygen gas withdrawn from the body of circulating oxygen, at a temperature range of substantially 75° to 120° C., and thereby synthesizing carboxylic acid radicals as terminal groups of said scission products.

2. The process of claim 1 wherein the fatty compound is commercial oleic acid.

3. The process of claim 1 wherein the fatty compound is erucic acid.

4. The process of claim 1 wherein the fatty compound is tall oil fatty acids.

5. The process of claim 1 wherein the fatty compound is a mixture of saturated and unsaturated fatty acids.

6. The process of claim 1 wherein the oxygen gas is commercially pure.

7. The process of claim 1 wherein the fatty compound is commercial oleic acid and the oxygen gas is commercially pure.

8. The process of manufacturing azelaic acid and pelargonic from oleic acid by the use of ozone which comprises preparing a mixture of oleic acid and pelargonic acid, the quantity of pelargonic acid in relation to the oleic acid being adapted to reduce the viscosity of the resulting ozonides sufficiently to permit them to be handled as a free flowing liquid, treating the mixture with ozone at a temperature of 25 to 45° C. until 15 to 17% of ozone based on the weight of the oleic acid present has been absorbed and then decomposing the ozonides and simultaneously oxidizing the aldehydes thus formed by elevating the temperature of the ozonides to a temperature above 60° C. in the presence of oxygen, the temperature of the reaction being held below 120° C. to form a mixed mass of oxidation products including azelaic acid and pelargonic acid and distilling pelargonic acid from said mass of mixed oxidation products.

9. The process of manufacturing azelaic acid and pelargonic from oleic acid by the use of ozone which comprises preparing a mixture of oleic acid and pelargonic acid, the quantity of pelargonic acid in relation to the oleic acid being adapted to reduce the viscosity of the resulting ozonides sufficiently to permit them to be handled as a free flowing liquid, treating the mixture with ozone at a temperature of 25 to 45° C. until 15 to 17% of ozone based on the weight of the oleic acid present has been absorbed and then decomposing the ozonides and simultaneously oxidizing the aldehydes thus formed by elevating the temperature of the ozonides to a temperature above 60° C. in the presence of oxygen, the temperature of the reaction being held below 120° C. to form a mixed mass of oxidation products including azelaic acid and pelargonic acid, distilling the pelargonic acid from said mixed oxidation products and separating azelaic acid from the remainder thereof.

10. The process of manufacturing azelaic acid and pelargonic from oleic acid by the use of ozone which comprises preparing a mixture of oleic acid and pelargonic acid, the quantity of pelargonic acid in relation to the oleic acid being adapted to reduce the viscosity of the resulting ozonides sufficiently to permit them to be handled as a free flowing liquid, treating the mixture with ozone at a temperature of 25 to 45° C. until 15 to 17% of ozone, based on the weight of the oleic acid present, has been absorbed and then decomposing the ozonides and simultaneously oxidizing the aldehydes thus formed by elevating the temperature of the ozonides to a temperature above 60° C. in the presence of oxygen, the temperature of the reaction being held below 120° C. to form a mixed mass of oxidation products including azelaic acid and pelargonic acid, distilling the pelargonic acid from said mixed oxidation products, distilling the remainder of said mass of mixed oxidation products to remove azelaic acid and other volatile acids from the still residue and separating azelaic acid from the mixture of azelaic acid and other acids by dissolving the azelaic acid in hot water.

11. The method of converting to carboxylic acids the ozonides of unsaturated fatty bodies of the class consisting of unsaturated fatty acids of 10–24 carbon atoms chain length and esters, nitriles, amides and soaps formed by modification of the carboxylic acid group of said acids, said method comprising feeding a stream of undecomposed ozonides into a heated pool of decomposed ozonides, treating the liquid of the pool with gaseous oxygen to oxidize the aldehydes formed by the scission of the ozonides to carboxylic acids, and cooling the reacting pool of liquid to maintain its temperature between 75 and 120° C., the volume of oxygen contacted with the liquid being sufficiently great to produce enough heat to require said cooling.

12. The method of forming two terminal carboxylic acid groups in place of the double bonds of unsaturated fatty bodies of the class consisting of unsaturated fatty acids of 10–24 carbon atoms chain length and esters, nitriles, amides and soaps formed by modification of the carboxylic acid group of said acids, said method comprising feeding a stream of undecomposed ozonides into a heated pool of decomposed ozonides treating the liquid of the pool with gaseous oxygen to oxidize the aldehydes formed by the scission of the ozonides to carboxylic acids, the said reaction being carried out at a temperature substantially in the range of 75–120° C.

References Cited in the file of this patent

UNITED STATES PATENTS

| | | |
|---|---|---|
| 1,210,949 | Knox | June 2, 1917 |
| 1,297,716 | Moisant | Mar. 18, 1919 |
| 2,004,586 | Riegler | June 11, 1935 |
| 2,083,572 | McKee | June 15, 1937 |
| 2,177,494 | Losch et al. | Oct. 24, 1939 |
| 2,292,950 | Loder et al. | Aug. 11, 1942 |
| 2,314,827 | Hortvet | Mar. 23, 1943 |
| 2,601,223 | Roedel | June 24, 1952 |
| 2,665,280 | Knobloh | Jan. 5, 1954 |

FOREIGN PATENTS

| | | |
|---|---|---|
| 25,324 | Great Britain | Dec. 14, 1895 |
| 15,440 | Great Britain | Mar. 25, 1912 |
| 565,158 | Germany | Nov. 26, 1932 |

OTHER REFERENCES

Molinari: Berichte 39, p. 2737 (1906).
Mottier: Helv. Chim. Acta 14, 1080–90 (1931).
Long: Chem. Reviews 27, p. 452 (1940).
Asinger: Berichte 75, pp. 656–660 (1942).
Rieche et al., Liebig's Annalen 553, 208 (1942).